(12) United States Patent
Albro et al.

(10) Patent No.: US 6,403,223 B1
(45) Date of Patent: Jun. 11, 2002

(54) CIRCULAR POLARIZER COMPRISING ANTI-REFLECTION MATERIAL

(75) Inventors: Thomas Francis Albro, Westminster; Daniel Francis Smith, Gaithersburg, both of MD (US)

(73) Assignee: Telspan Services Inc., Hyattsville, MD (US)

( * ) Notice: Subject to any disclaimer, the term of this patent is extended or adjusted under 35 U.S.C. 154(b) by 0 days.

(21) Appl. No.: 09/359,890

(22) Filed: Jul. 26, 1999

Related U.S. Application Data

(60) Provisional application No. 60/114,897, filed on Jan. 5, 1999.

(51) Int. Cl.[7] .................. B32B 27/08; B32B 27/28; B32B 27/40; G02B 27/28
(52) U.S. Cl. .................. 428/421; 428/422; 428/423.1; 428/424.2; 428/424.6; 359/485; 359/493; 359/601; 359/609
(58) Field of Search ............... 428/421, 422, 428/423.1, 424.2, 424.6; 359/485, 487, 488, 493, 495, 500, 601, 609

(56) References Cited

U.S. PATENT DOCUMENTS 2,173,304 A  5/1939  Land et al.

(List continued on next page.)

OTHER PUBLICATIONS

Mihama Corporation, Product Description of ARCTOP (Apr. 16, 1997).
Asahi Glass Company (Webpage), CYTOP, Description of ARCTOP, Apr. 4, 1997.
Asahi Glass Company (Webpage), Description of CYTOP, Apr. 4, 1997.
Asahi Glass Company, ARCTOP Information and Technical Data Sheets.
Polaroid, Linear and Circular Polarizers Technical Brochure, Sept. 1995.
Polaroid, ATM Anti–glare Filters, Technical Brochure, Jul. 1997.
Polaroid (Webpage), Polarizing Filters and Circular Polarizers Technical Information, Jul. 1998.

* cited by examiner

Primary Examiner—Vivian Chen
(74) Attorney, Agent, or Firm—Birch, Stewart, Kolasch & Birch, LLP

(57) ABSTRACT

An optical article comprising a first layer of a transparent resin having a self-healing property; an antireflection layer consisting essentially of a non-crystalline fluorine-containing polymer disposed underneath said first layer; and a circular polarizer disposed underneath said antireflection layer. The optical article has anti-reflective and anti-glare properties and also has self-healing properties and scuff resistance imparted by a thin, multi-layered film. The optical article thus is effective in reducing reflection and glare.

19 Claims, 2 Drawing Sheets

U.S. PATENT DOCUMENTS

| | | |
|---|---|---|
| 2,255,940 A | 9/1941 | Rogers |
| 2,306,108 A | 12/1942 | Land et al. |
| 3,576,356 A * | 4/1971 | Hyman et al. ............... 350/156 |
| 4,278,736 A | 7/1981 | Kamerling |
| 4,351,681 A | 9/1982 | Kamerling |
| 4,557,742 A | 12/1985 | Thigpen |
| 4,697,881 A | 10/1987 | Brown |
| 4,747,674 A | 5/1988 | Butterfield et al. |
| 4,865,668 A * | 9/1989 | Goepfert et al. ............... 156/74 |
| 4,896,218 A * | 1/1990 | Vick ......................... 358/253 |
| 4,977,028 A * | 12/1990 | Goepfert et al. ............ 428/426 |
| 4,989,953 A | 2/1991 | Kirschner |
| 4,995,701 A | 2/1991 | Brown |
| 5,139,879 A | 8/1992 | Aharoni et al. |
| 5,225,244 A | 7/1993 | Aharoni et al. |
| 5,244,713 A | 9/1993 | Nakamura et al. |
| 5,246,782 A | 9/1993 | Kennedy et al. |
| 5,278,694 A | 1/1994 | Wheatley et al. |
| 5,292,784 A | 3/1994 | McKinney et al. |
| 5,305,143 A | 4/1994 | Taga et al. |
| 5,313,315 A | 5/1994 | Feinberg et al. |
| 5,326,968 A | 7/1994 | Johnson et al. |
| 5,449,558 A | 9/1995 | Hasegawa et al. |
| 5,476,717 A | 12/1995 | Floch |
| 5,486,949 A | 1/1996 | Schrenk et al. |
| 5,587,816 A | 12/1996 | Gunjima et al. |
| 5,612,820 A | 3/1997 | Schrenk et al. |
| 5,689,371 A | 11/1997 | Butterfield |
| 5,691,044 A | 11/1997 | Oyama et al. |
| 5,744,227 A | 4/1998 | Bright et al. |
| 5,783,299 A | 7/1998 | Miyashita et al. |

CIRCULAR POLARIZER COMPRISING ANTI-REFLECTION MATERIAL

This application claims priority on provisional Application No. 60/114,897 filed on Jan. 5, 1999, the entire contents of which are hereby incorporated by reference.

FIELD OF THE INVENTION

The present invention relates to an optical article having anti-reflective and anti-glare properties and also having self-healing properties and scuff resistance imparted by a thin, multi-layered film. The optical article of the present invention thus is effective in reducing glare.

DESCRIPTION OF THE PRIOR ART

The problem that is solved by this invention is one of glare or reflection. Many organizations use outdoor monitors to convey information or conduct business with visitors and customers. Also, banks, for example, use Automatic Teller Machines (ATMs) to conduct business with their customers. In many instances, a customer cannot clearly see the monitor screen because of a reflection or glare. The reflection or glare may be caused by, for example, sun light or reflected light from, for example, concrete. The present inventors have developed a highly effective product in reducing the problem of glare and/or reflection.

Sometimes glare is distinguished from a reflection as being more dull, usually from a matte finish (as opposed to a gloss finish). Since the optical article of the present invention greatly reduces both glare and reflection, for the purposes of this Specification, no distinction between the two is made.

Various methods of reducing glare and reflection have been proposed. For example, linear and circular polarizers are well known to those skilled in the art.

U.S. Pat. Nos. 2,173,304; 2,306,108 and 2,255,940 disclose light polarizing material.

U.S. Pat. No. 5,326,968 discloses a photoelectric sensor adapted for use in specific applications which requires the additional attachment of a circular polarizer.

U.S. Pat. No. 5,015,072 discloses a glare-reducing shield usable with a touch-screen display that includes a shade positioned above the display and a circular polarizer mounted within the shade and above the touch-screen display.

U.S. Pat. No. 4,278,736 discloses a contrast enhancement filter having a sheet-like circular polarizer disposed between two glass substrates secured by a polyvinyl butyral adhesive. The contrast enhancement filter of U.S. '736 is typically used in conjunction with a display tube of a conventional type or other display such as a gas plasma or light emitting diode (L.E.D.) which has a transparent face plate in one wall thereof.

U.S. Pat. No. 4,747,674 also discloses a contrast enhancement filter comprising a fluorinated polymer, an indium tin oxide (antistatic) layer, and a circular polarizer. Examples of useful fluorinated polymers include vinylidene fluoride homopolymers and copolymers, perfluorinated polyolefins and fluorinated acrylates and methacrylates. The contrast enhancement filter of U.S. '674 is disclosed as being useful as a means for reducing specular glare from the surface of cathode ray tubes, computer display screens and the like.

U.S. Pat. No. 5,449,558 discloses an optical article comprising a layer of a resin having self-healing properties and scuff resistance, and an anti-reflection layer of a non-crystalline fluorine-containing polymer. Example 1 describes the use of the optical article in combination with a linear polarizer.

SUMMARY OF THE INVENTION

The present invention relates to an optical article that comprises a layer of a transparent resin having a self-healing property; an antireflection layer; and a circular polarizer. Further, the optical article of the present invention is also soil and stain resistant. Thus, soil and stains from, for example, fingerprints and graffiti may be easily removed. Preferably, the optical article of the present invention comprises a first layer of a transparent resin having a self-healing property; an antireflection layer consisting essentially of a non-crystalline fluorine-containing polymer disposed underneath the first layer; and a circular polarizer disposed underneath the antireflection layer. The elasticity of the first layer helps provide for the self-healing property and thus helps provide the scratch and scuff resistance of the optical article of the present invention.

The optical article of the present invention provides anti-reflective and glare reduction properties by means of a non-crystalline fluorine-containing polymer and is used with a circular polarizer. The optical article is then placed in front of, for example, a viewable screen. When a protective screen (i.e., a prior art protective screen) is installed in front of a display screen, about 5% of the incoming light is reflected back to the viewer from the first surface (i.e., the protective screen). The remaining 95% pass through the first surface and about 5% of the remaining light is reflected back from the second surface (i.e., the display screen) through the protection material. Thus, about 10% of the light is reflected and perceived as glare to the viewer.

The non-crystalline fluorine-containing polymer reduces the first surface reflection from about 5% to about 0.5%. The circular polarizer reduces the reflected light from the second surface by about 94–100% (depending on the wavelength of the light). The combined glare reduction of the optical article of the present invention thus reduces the glare of the incoming light by about 93.5–100% as compared to a standard monitor having no antireflection film depending on the wavelength of the incoming light. The optical article of the present invention is also durable, scratch resistant, has self healing properties and improves contrast and brightness.

Preferably, the optical article of the present invention is placed over, for example, a monitor such as computer screen, television, bank ATM machine, outdoor monitor, indoor monitor or an electronic navigation screen. The optical article of the present invention reduces glare without adversely affecting the image as seen by the operator.

Further, the optical article of the present invention is cost-effective and, as such, can be used in such applications as for example, storefront windows.

DETAILED DESCRIPTION OF THE INVENTION

Figure 1:
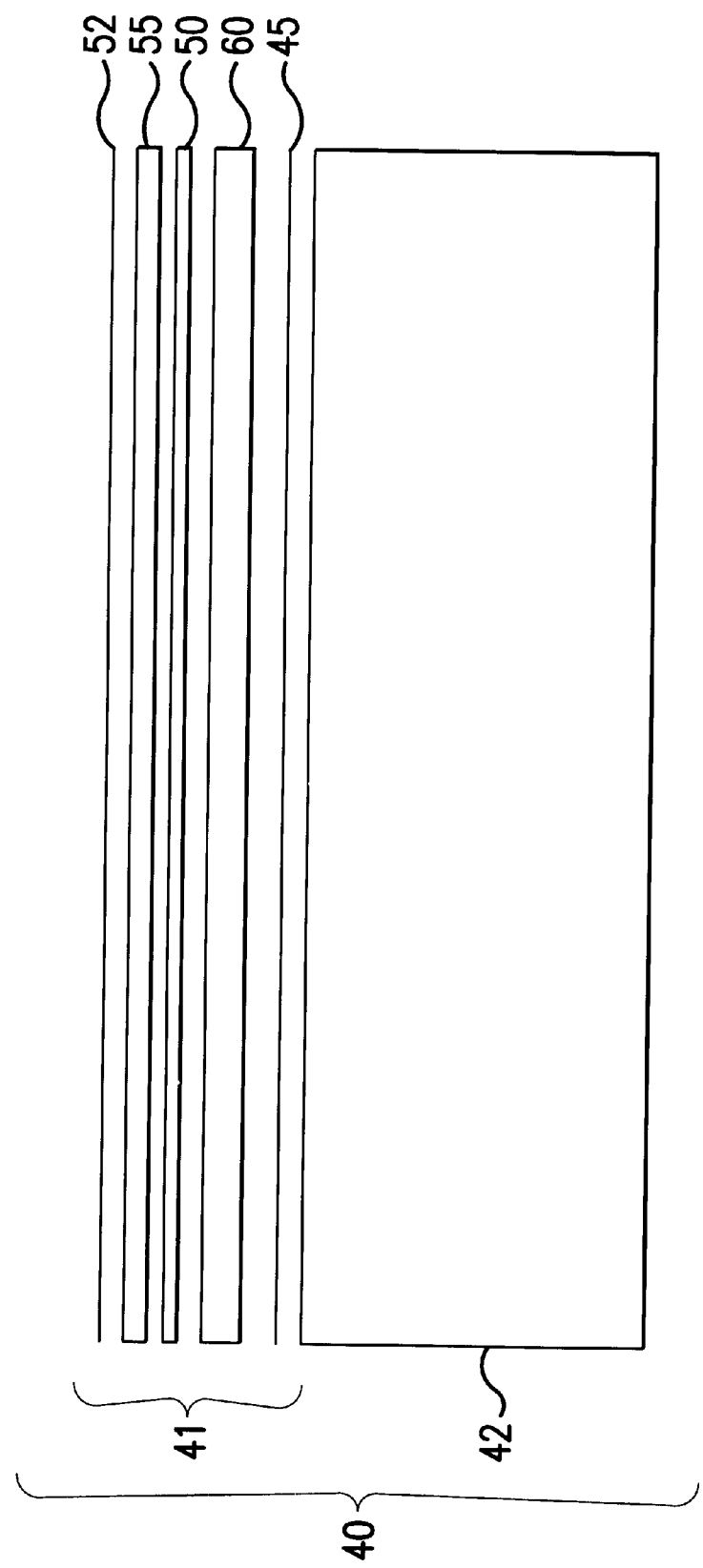
FIG. 1 is a cross-sectional diagram showing the layers of an example of an optical article of the present invention.

As indicated above, optical article of the present invention provides anti-reflective and glare reduction properties by means of a non-crystalline fluorine-containing polymer and a circular polarizer. The optical article of the present invention may further comprise an optional high refractive index layer and an optional transparent plastic film.

More specifically, the optical article of the present invention comprises (i) a protective film that is preferably a layer of a transparent resin having a self-healing property of at least 10 g as measured by a Heidon scratch tester at 23° C. under a relative humidity of 50% using a diamond chip having a forward end diameter of 15 $\mu$m as a scratching tool and scuff resistance as measured by the haze increase after 100 rotations by a Taber abrasion test conduct under a load of 500 g using CS-10F as the truck wheel at 23° C. under a relative humidity of 50% of less than 10%. The optical article of the present invention also comprises (ii) an antireflection layer consisting essentially of a non-crystalline fluorine-containing polymer, wherein the non-crystalline fluorine-containing polymer is a polymer having fluorine-containing aliphatic ring structures, or a perfluoropolyether. The anti-reflection layer preferably has a thickness of from 10 to 1,000 nm. The optical article of the present invention may further comprise (iii) an interlayer of a resin having a refractive index higher than the refractive index of the resin having self-healing properties and scuff resistance, between the layer of the resin having self-healing properties and scuff resistance and the antireflection layer of a non-crystalline fluorine-containing polymer. Finally, the optical article of the present invention comprises (iv) a circular polarizer.

Fingerprints are easily removed from the surface by wiping with, for example, tissue paper. The abrasion resistance of the optical article of the present invention using a diamond scratch test is about 40 grams or more. The optical article of the present invention has a high thermal stability (decomposition temperature is >400° C.), low refractive index (about 1.34 at 25 to 60 degrees Celsius), and low water absorption (<0.01%). Further, the optical article of the present invention has excellent chemical resistance and is non-flammable. Specifically, the optical article of the present invention will withstand the following chemicals applied at 60 degrees Celsius, no more than once a week: 98% $H_2SO_4$, 50% HF, and 44% NaOH. The optical article of the present invention will withstand the following organic solvents applied not more than once a week: Benzene, Hexane, MEK, and CCCL4.

The environmental assessment of the optical article of the present invention is that it has a high temperature/humidity stability at 60 degrees Celsius at 90% relative humidity for at least 500 hours. The optical article of the present invention has a shelf life of at least 500 hours at a temperature of about 90 degrees Celsius, and for about 500 hours at a temperature of about −30 degrees Celsius. Furthermore, the optical article of the present invention will withstand about 40 heat cycles of about −30 degrees Celsius to 80 degrees Celsius.

An embodiment of the present invention is illustrated in FIG. 1. FIG. 1 represents a cross-section view of an embodiment of the optical article 40 of the present invention which comprises an antireflection film 41 disposed on a circular polarizer 42 by means of an optional adhesive layer 45. The antireflection film 41 comprises a non-crystalline fluorine-containing polymer 50 and an optional scratch and scuff resistant protection film 52. The protective film optionally possesses self-healing properties which aid in scratch resistence. An optional high refractive index layer 55 is disposed between the non-crystalline fluorine-containing polymer 50 and an optional scratch and scuff resistant protection film 52. The antireflection film 41 may further comprise a transparent plastic film 60 that functions as a support.

The optical adhesive layer 45 may be a bonding material comprising a plasticized polymerized incomplete polyvinyl acetal resin. It is apparent to one of ordinary skill in the art that other bonding materials, such as vinyl acetate, methyl methacrylate and the like, usually plasticized, may be used in obtaining the lamination. The essential quality is an optically transparent self-stick bonding material that works at nominal room temperature. Thus, the adhesive material is not critical as long as it does not interfere with the practice of the invention.

The non-crystalline fluorine-containing polymer 50 of the present invention is substantially free from light scattering and is excellent in transparency. Widely known as fluorine-containing polymers are, for example, a polytetrafluoroethylene resin, a perfluoro(ethylenepropylene) resin, a perfluoroalkoxy resin, a ployvinylidene fluoride resin, an ethylenetetrafluoroethylene resin and a polychlorotrifluoroethylene resin. However, many of such fluorine-containing polymers are crystalline in nature, whereby light scattering occurs and transparency is not good.

A non-crystalline fluorine-containing polymer is free from light scattering by crystals and thus is excellent in the transparency. Such a non-crystalline fluorine-containing polymer may be, for example, a fluoroolefin type copolymer such as a three component copolymer comprising from 37 to 48 wt % of tetrafluoroethylene, from 15 to 35 wt % of vinylidene fluoride and from 26 to 44 wt % of hexafluoropropylene, an alternating copolymer of chlorotrifluoroethylene and vinyl ether, a copolymer of tetrafluoroethylene with carboxyperfluorovinyl ether, a copolymer of tetrafluoroethylene with sulfonyl perfluoroethylene, a copolymer of 1,1-difluoroethylene with hexafluoropropylene, a copolymer of tetrafluoroethylene with propylene, a perfluoropolyether, or a polymer having fluorine-containing aliphatic ring structures. The polymer having fluorine-containing aliphatic ring structures is particularly preferred, since it is excellent in the mechanical properties such as creep resistance. Preferred as the polymer having fluorine-containing aliphatic ring structures, is one obtained by polymerizing a monomer having a fluorine-containing ring structure, or a polymer having ring structures in the main chain which is obtained by cyclic polymerization of a fluorine-containing monomer having at least two polymerizable double bonds.

Examples of polymers having ring structures on their main chain which are obtainable by polymerizing a monomer having a fluorine-containing ring structure, may be found in, for example, Japanese Unexamined Patent Publication No. 08964/1988 or No. 238115/1988. Namely, such a polymer is obtainable by homopolymerizing a momomer having a fluorine-containing ring structure such as perfluoro (2,2-dimethyl-1,3-dioxol), or by copolymerizing it with a radical polymerizable monomer such as tetrafluoroethylene.

Examples of polymers having ring structures on their main chain which are obtainable by cyclic polymerization of a fluorine-containing monomer having at least two polymerizable double bonds, may be found in, for example, Japanese Unexamined Patent Publication No. 238111/1988 or No. 238115/1988. Namely, such a polymer is obtainable by cyclic polymerization of perfluoro(allylvinyl ether) or perfluoro(butenylvinyl ether), or by copolymerizing it with a radical polymerizable monomer such as tetrafluoroethylene.

Otherwise, it may be a polymer obtainable by copolymerizing a monomer having a fluorine-containing structure such as perfluoro(2,2-dimethyl-1,3-dioxol) with a fluorine-containing monomer having at least two polymerizable double bonds, such as perfluoro(allylvinyl ether) or perfluoro(butenylvinyl ether).

As the polymer having fluorine-containing aliphatic ring structures, a polymer having ring structures on its main chain is preferred. A polymer containing at least 20 mol % of ring structures in the monomer units constituting the polymer, is preferred from the viewpoint of the transparency and mechanical properties.

As other non-crystalline fluorine-containing polymers, perfluoro polyethers of the following formulae (Ka 1) and (Ka 2) having reactive groups at both terminals and having a number average molecular weight of from 500 to 100,000, preferably from 1,000 to 10,000, are examples. As the reactive groups, isocyanate groups capable of providing excellent adhesion to the self-healing scuff resistant film, are particularly preferred.

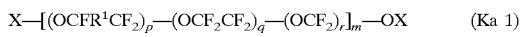

$$X-[(OCFR^1CF_2)_p-(OCF_2CF_2)_q-(OCF_2)_r]_m-OX \quad\quad (Ka\ 1)$$

wherein X is an organic group containing an isocyanate group, a hydroxyl group, an amino group, an epoxy group, an acrylate group, a methacrylate group, a cyanamide group or a maleimide group, $R^1$ is F or $CF_3$, and each of p, q, r and m is an integer.

$$HOCH_2Y-[(OCFR_2CF_2)_s-(OCF_2CF_2)_t-(OCF_2)_u]_n-Y-CH_2OH \quad\quad (Ka\ 2)$$

wherein Y is a perfluoroaliphatic group, $R^2$ is F or $CF_3$, and each of s, t, u and n is an integer.

When an optional high refractive index layer 55 is used, the high refractive index layer preferably is an interlayer comprising a resin having a refractive index higher than the refractive index of the resin having self-healing properties and scuff resistance. The high refractive index layer is preferably disposed between the antireflection layer of a non-crystalline fluorine-containing polymer and the layer of the resin having self-healing properties and scuff resistance (i.e., the protective film 52).

The resin having a high refractive index is preferably a polymer having aromatic rings in its main chain or side chains, such as polystyrene, poly(o-chlorostyrene), poly(2,6-dichlorostyrene), poly(bromostyrene), poly(2,6-dibromostyrene), polycarbonate, aromatic polyester, polysulfone, polyether sulfone, polyaryl sulfone, poly(pentabromophenyl methacrylate), a phenoxy resin or its brominated product, or an epoxy resin or its brominated product. Further, it is possible to modify the terminals of such resins with reactive functional groups, such as amide groups, amino groups, epoxy groups, hydroxy groups, carboxyl groups, (meth)acryloyl groups or silanol groups, to increase the adhesion to the substrate or to the layer made of the non-crystalline fluorine-containing polymer.

Among the above resins, the phenoxy resin and the epoxy resin have reactive hydroxyl groups in their molecules and already have active epoxy groups at the terminals without modification, and they are preferred as such from the viewpoint of adhesive properties. The sulfone-type polymer such as polysulfone, polyether sulfone or polyaryl sulfone, is preferably a polymer containing sulfur atoms in its main chain. Further, an organic oxide such as $Al_2O_3$, $SnO_2$, $In_2O_3$, $Nd_2O_3$, $ZrO_2$, $TiO_2$, $Ta_2O_5$, $Y_2O_3$, or $CeO_2$ may also be preferably employed. Further, an additive such as a plasticizer or a binder may be incorporated thereto, as the case requires.

As the protective film having self-healing properties and scuff resistance, a soft resin such as a polyurethane resin, an acrylic transparent rubber-like resin, a silicone rubber-like resin, an olefin-type or styrene-type elastomer, or a blend product or a polymer alloy thereof with other resins, may be used. However, a polyurethane resin is most preferred from the viewpoint of the balance of the transparency, the self-healing properties and the scuff resistance. The thickness of the film may be determined depending upon the properties required for the article to be used and is not particularly limited.

As an index for the self-healing properties, it is desirable that "the self-healing property as measured by a HEIDON scratch tester at 23° C. under a relative humidity of 50% using a diamond chip having the forward end diameter of 15 μm as a scratching tool" (hereinafter referred to as the self-healing property) is at least 10 g.

As an index for the scuff resistance, it is desirable that "the haze increase after 100 rotations by a Taber abrasion test conducted under a load of 500 g using CS-10F as the truck wheel at 23° C. under a relative humidity of 50%" (hereinafter referred to as haze increase) is preferably less than 10%.

The polyurethane resin is preferably one disclosed in Japanese Unexamined Patent Publication No. 56717/1989. Particularly preferred from the viewpoint of yellowing resistance, is a non-yellowing polyurethane resin. The non-yellowing polyurethane resin is a polyurethane resin prepared by using a polyol and a non-aromatic polyisocyanate having no isocyanate group directly bonded to an aromatic nucleus, as the starting materials. The film surface may have fine irregularities to avoid reflection due to light scattering. As the molding method, extrusion molding, injection molding, blow molding, cast molding or calendar molding may be employed. Particularly preferred is a reactive casting method from the viewpoint of the optical quality of the resulting film relating to a distortion of an image, or from such a viewpoint that even a crosslinkable resin can be thereby molded. As the polyurethane resin having self-healing properties and scuff resistance, which is obtainable by the reactive casting method, a linear resin (thermoplastic resin) or a crosslinkable resin (thermosetting resin) may be used. However, a crosslinkable resin is preferred from the viewpoint of the chemical resistance, stain resistance and durability.

The urethane resin obtainable by the reactive casting method may be formed into a film by mixing a polyol, a hydroxyl group terminal composition such as a chain extender and a polyisocyanate, followed by coating and curing on a substrate to form a film. As such a polyol, a polyether type, polyester type or polycarbonate type polyol may be used. From the viewpoint of durability, price, and balance of the strength, scuff resistance and self-healing properties, a polyester type polyol is preferred. The number of functional groups is required to be larger than 1 on average and preferably from 2 to 3 from the viewpoint of the balance of the strength, elongation, self-healing properties and scuff resistance. Further, a chain extender may be employed, as the case requires. As the chain extender, a short chain diamine or a short chain polyamine, may be employed. From the viewpoint of transparency and flexibility, a short chain diol is preferred.

As the polyisocyanate, an aromatic diisocyanate, an aromatic polyisocyanate, an aliphatic diisocyanate, an aliphatic polyisocyanate, an alicyclic diisocyanate, or an alicyclic polyisocyanate may, for example, be used. From the viewpoint of yellowing resistance, an aliphatic or alicyclic diisocyanate or polyisocyanate is preferred.

These starting materials may be used alone or in combination as a mixture. Further, a stabilizer such as an ultraviolet absorber, an antioxidant or a photostabilzer, or an additive such as a urethane-modified catalyst, an extender, a coloring agent or a flame retardant may be incorporated, as the case requires. Further, a color or a pattern may be applied, as the case requires. Such a color or a pattern may be applied by adding a colorant directly to the film or by printing, or by bonding or laminating a new film having a color or a pattern.

In the present invention, the polyurethane soft resin film may be a single layer film or a laminated film. In the case of a laminated film, at least one of the surface layers is required to be a polyurethane soft resin.

With respect to an antireflection layer utilizing light interference of a thin film, the thickness of the layer is optically strictly designed. For example, in the case of a single layer coating of a polymer having fluorine-containing aliphatic ring structures, the thickness $d_1$ of this polymer layer is represented by $d_1=(2m_1^{-1})\cdot\lambda/(4n_1)$ where $n_1$ is the refractive index of this polymer and $\lambda$ is the wavelength of the light in question. Here, $m_1$ is a positive integer and preferably $m_1=1$ in order to reduce the reflection within a wide range of wavelengths. The thickness $d_1$ is usually from 10 to 1,000 nm, preferably from 20 to 500 nm, not to impair the functions of the layer of a resin having self-healing properties and scuff resistance.

When an interlayer of a resin having a refractive index higher than the refractive index of the above-mentioned resin having self-healing properties and scuff resistance is provided between the antireflection layer of a non-crystalline fluorine-containing polymer and the layer of the resin having self-healing properties and scuff resistance, the condition required for the thickness scuff resistance, the condition required for the thickness $d_1$ is the same as in the case where no such interlayer is present. The thickness $d_2$ of the resin layer having a high refractive index is represented by $d_2=(2m_2^{-1})\cdot\lambda/(4n_2)$ where $n_2$ is the refractive index of this resin. Here, $m_2$ is a positive integer and is preferably $m_2=1$, for the same reason as for $m_1$. Under this condition, the antireflection effects are highest against the light with a wavelength of $\lambda$. However, the thickness may be adjusted to be $d_2=(2m_{2-1})\cdot\lambda/(2n_2)$ to make the invention applicable to a wider range of wavelengths, or may be designed to be other intermediate thicknesses. The thickness $d_2$ is usually from 10 to 1,000 nm, preferably from 20 to 500 nm, not to impair the functions of the layer of a resin having self-healing properties and scuff resistance.

The deviation of the real layer thickness from the designed value is preferably within a range of ±10%, more preferably within a range of ±5%, to attain the predetermined antireflection performance. Further, the variation in the layer thickness in the same plane is preferably within a range of ±5%, more preferably within a range of ±3%, since if the variation is large, the color of the reflected lights will be non-uniform whereby the appearance will be impaired.

The effects of the interlayer will be observed when $n_2>n_3$, where $n_2$ is the refractive index of the interlayer, and $n_3$ is the refractive index of the resin having self-healing properties and scuff resistance. If $d_2=(2m_2^{-1})\cdot\lambda/(4n_2)$ is employed, the highest antireflection effects can be obtained when $n_2=n_1\cdot(n_3)^{1-2}$. On the other hand, if $d_2=(2m_{2-1})\cdot\lambda/(2n_2)$ is employed, the highest antireflection effects can be obtained when $n_2=n_{1\cdot n1}$.

The particular transparent plastic support 60 used in the optical material is not critical, as long as the support does not adversely affect the function of the optical article. The purpose of the transparent plastic support 60 is to provide support and hold in a stable medium. That is, it provides dimensional stability. By way of example, the transparent plastic support 60 may be a polyurethane-type soft resin. An example of such a resin is film D as disclosed in U.S. Pat. No. 5,449,558 to Hasegawa.

In the present invention, there is no particular restriction as to the method for forming the antireflection layer, and any optional processing method may be selected for use. For example, a polymer having fluorine containing aliphatic ring structures, is soluble in a certain specific fluorine-type solvent, and by coating a solution of this polymer, it is readily possible to form an antireflection layer having a predetermined layer thickness.

As the coating method, dip coating, roll coating, spray coating, gravure coating, comma coating or die coating may, for example, be selected. By these coating methods, continuous processing is possible, whereby the productivity is excellent as compared with a vapor deposition method of a batch type. The solvents which can be used for such coating methods, include fluorine-type solvents, for example, a perfluoroalkane such as $C_nF_{2n+2}$ (n:6–12), a perfluoroamine such as $(CnF_{2n+1})_3N$ (n:3–5), $CF_3(CF_2)_nCH=CH_2$ (n:5–11), $CF_3(CF_2)_mCH=CH_2$ (m:5–11), and perfluoro(2-butyltetrahydrofuran). Among them, perfluoroctane or perfluoro(2-butyltetrahydronfuran) is preferably employed for dip coating or die coating from the viewpoint of e.g., the boiling point (about 100° C.), and particularly for the die coating method, such a solvent is preferably employed alone or in combination with perfluorotributylamine. In order to increase the adhesion of the polymer having fluorine-containing aliphatic ring structures to the surface of an optical article, corona discharge treatment, treatment with active energy rays such as ultraviolet treatment, or primer treatment may be preliminarily applied to the surface of the article.

Also in a case where an interlayer of a resin having refractive index higher than the refractive index of the above-mentioned resin having self-healing properties and scuff resistance, is provided between the antireflection layer of a non-crystalline fluorine-containing polymer and the layer of the resin having self-healing properties and scuff resistance, it is effective to apply corona discharge treatment, treatment with active energy rays such as ultraviolet treatment, or primer treatment preliminarily to the interlayer in order to increase adhesion.

In order to increase adhesion between the layers of the optical article of the present invention, it is effective to incorporate a silane coupling agent into at least one of the three layers. Good results can be obtained particularly when it is incorporated to the non-crystalline fluorine-containing polymer.

Such a silane coupling agent may be selected within a wide range of silane coupling agents including those known or well known heretofore. For example, a monoalkoxysilane such as vinyltriethoxysilane, trimethylmethoxysilane, trimethylethoxysilane, dimethylvinylmethoxysilane or dimethylvinylethoxysilane, may be used.

Further, a dialkoxysilane such as γ-chloropropylmethyldimethoxysilane, γ-chloropropylmethyldiethoxysilane, γ-aminopropylmethyldiethoxysilane, γ-aminopropylmethyldimethoxysilane, N-β-(aminoethyl)-γ-aminopropylmethyldimethoxysilane, N-β-(aminoethyl)-γ-aminopropylmethyldiethoxysilane, γ-glycidoxypropylmethyldimethoxysilane, γ-glycidoxypropylmethyldiethoxysilane, γ-methacryloxypropylmethyldimethoxysilane, methyldimethoxysilane, methyldiethoxysilane, dimethyldimethoxysilane, dimethyldiethoxysilane, methylvinyldimethoxysilane, methylvinyldiethoxysilane, diphenyldimethoxysilane, diphenyldiethoxysilane, 3,3,3-trifluoropropylmethyldimethoxysilane, 3,3,4,4,5,5,6,6,7,7,8,8,8-tridecafluorooctylmethyldimethoxysilane, or 3,3,4,4,5,5,6,6,7,7,8,8,9,9,10,10,10-heptadecafluorodecylmethyldimethoxysilane, may be mentioned.

Further, a tri- or tetra-alkoxysilane such as γ-aminopropyltrimethoxysilane, γ-aminopropyltriethoxysilane, N-β-(aminoethyl)-γ-aminopropyltrimethoxysilane, N-β-(aminoethyl)-γ-aminopropyltriethoxysilane, γ-mercaptopropyltrimethoxysilane, γ-glycidoxypropyltrimethoxysilane, γ-glycidoxypropyltriethoxysilane, γ-methacryloxypropyltrimethoxysilane, γ-chloropropyltrimethoxysilane, methyltriethoxysilane, phenyltrimethoxysilane, phenyltriethoxysilane, 3,3,3-trifluoropropyltrimethoxysilane, 3,3,4,4,5,5,6,6,7,7,8,8,8-tridecafluorooctyltrimethoxysilane, 3,3,4,4,5,5,6,6,7,7,8,8,9,9,10,10,10-heptadecafluorodecyltrimethoxysilane, tetramethoxysilane, or tetraethoxysilane, are examples.

These alkoxysilanes may be used alone or in combination as a mixture. Among them, an alkoxysilane having an amino group such as γ-aminopropyltriethoxysilane, γ-aminoproylmethyldiethoxysilane, γ-amionpropyltrimethoxysilane, γ-aminopropylmethyldimethoxysilane, N-β-(aminoethyl)-γ-aminopropyltrimethoxysilane or N-β-(aminoethyl)-γ-aminopropylmethyldimethoxysilane, N-β-(aminoethyl)-γ-aminopropyltriethoxysilane or N-β-(aminoethyl)-γ-aminopropylmethyldiethoxysilane, or an alkoxysilane having an epoxy group such as γ-glycidoxypropyltrimethoxysilane, γ-glycidoxypropylmethyldimethoxysilane, γ-glycidoxypropyltriethoxysilane or γ-glycidoxypropylmethyldiethoxysilane, may, for example, be mentioned as particularly preferred to improve the adhesiveness of the fluorine-containing polymer without impairing the transparency of the fluorine-containing polymer.

As stated above, there is no particular restrictions on methods of making the antireflection film 40 of the present invention including those known to one of ordinary skill in the art, particularly including the methods disclosed in U.S. Pat. No. 5,449,558 to Hasegawa et al. For example, see the Preparation Examples and Example of U.S. '558 at cols. 8–12.

A preferred embodiment of the antireflection film of the present invention is ARCTOP®, available from Asahi Glass Co., Tokyo, Japan.

The particular circular polarizer 42 used in the optical article of the present invention is not known to be critical as long as it fits the criteria set forth herein. A circular polarizer is utilized in the present invention because of the unexpected and superior glare reduction properties the circular polarizer exhibits in reducing glare and/or reflections from the surface that is behind it.

A circular polarizer comprises a linear polarizer and a quarter-wave retarder whose slow and fast axes are 45° to the axis of the polarizer. A ray of unpolarized light, passing through the linear polarizer, becomes polarized at 45° to the axis of the retarder. When this polarized light ray passes through the retarder its vibration direction is made to move in a helical pattern. After the light ray is reflected from a specular surface the sense of rotation of the vibration reverses. This rotation is stopped in the return through the retarder. The light ray at this point is linearly polarized in a plane 90° to its original polarization plane, and is blocked by the linearly polarized component of the circular polarizer.

A circular polarizer is usually very thin and fragile, so preferably the circular polarizer is disposed in-between two protective supports. The nature of the supports are not critical, and can be of various thicknesses. For example, the supports may be plastic, acrylic or glass. The thicknesses may vary, for example, from about 0.10" to about 0.3" or thicker. For the purposes of this invention, mention of "circular polarizer" optionally includes the circular polarizer and the supports.

Figure 2A:
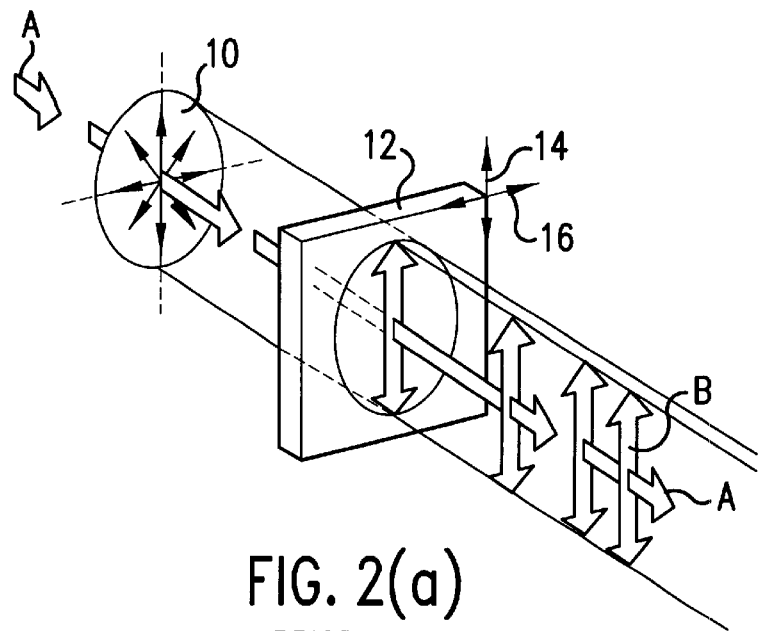
FIGS. 2(a) and 2(b) are diagrams illustrating the operation of linear and circular polarizing components.
Figure 2B:
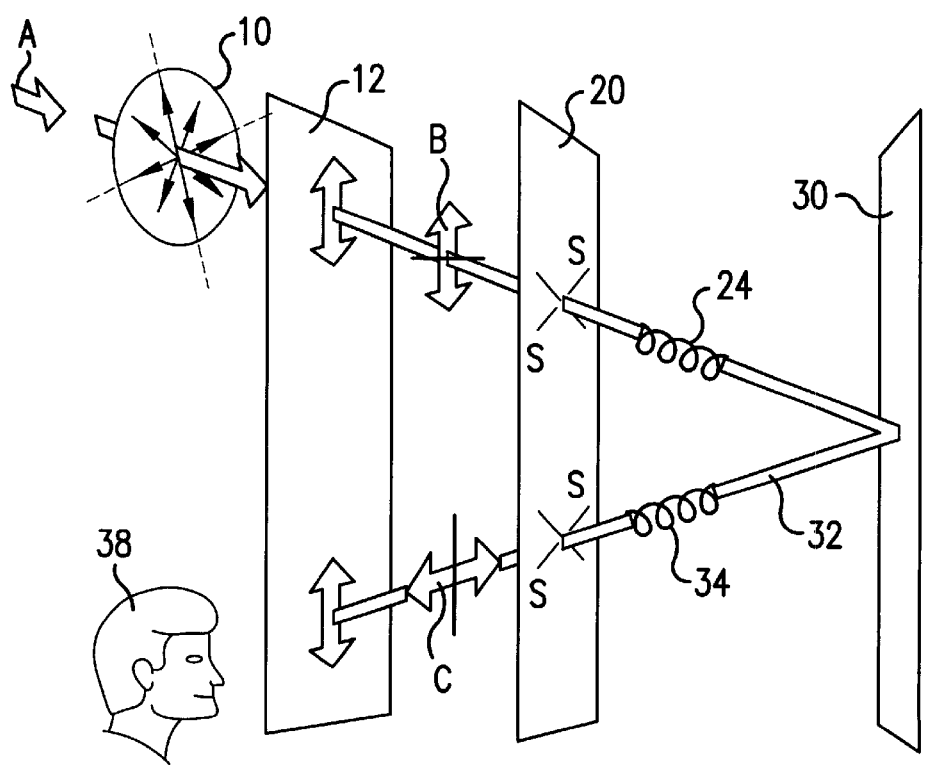

FIGS. 2(a) and 2(b) illustrate the operation of linear and circular polarizing components, respectively. As such, the characteristics illustrated in FIGS. 2(a) and 2(b) are well known to those skilled in the art. The arrows A in FIG. 2(a) represent the direction of travel of light passing from a source of unpolarized light symbolically identified by reference numeral 10 through a linear polarizer 12 which has a transmitting axis 14 and an absorbing axis 16. As the light passes through the linear polarizer, the light is polarized and only that light which is aligned with the transmitting axis is permitted to pass through the linear polarizer. The light passing through the linear polarizer 12 is symbolically represented by arrows B which are aligned in a predefined plane parallel to the transmitting axis 14.

FIG. 2(b) illustrates light passing in the direction represented by arrows A through a linear polarizer 12 and a quarter-wave retarder 20. Beginning as unpolarized light 10, the light is polarized in the direction represented by arrow B after passing through the linear polarizer. Then, the light passes through the quarterwave retarder and is effectively rotated by 45 degrees to the axis s of the quarter-wave retarder to result in polarized right circular light represented by reference numeral 24. If the light strikes an object 30 which does not result in a scattering of the circularly polarized light, it will return, along the line identified by reference numeral 32 as light that is polarized left circular and identified by reference numeral 34. As it passes again through the quarterwave retarder 20, the light is polarized in the direction represented by arrow C. This light can not pass through the linear polarizer 12 and, therefore, can not be seen at the position identified by person 38.

With continued reference to FIG. 2(b), it should be realized that the combination of a linear polarizer 12 and a quarter-wave retarder 20 forms a circular polarizer of the present invention. In a photoelectric sensing application, the unpolarized light 10 would typically be provided by a light emitting diode disposed within the housing of a photoelectric sensor and a photosensitive device, such as a photo diode, a phototransistor or a photodarlington transistor, would also be included within the housing and would sense the light returning from a reflective object. This is referred to as a retroreflective application. The use of a circular polarizer in this manner permits a photoelectric device to sense components that would otherwise not be detectable.

The antireflection film 41 may be disposed on the circular polarizer 42 of the present invention by a dry or wet lamination method as follows:

In the dry method, the antireflection film is placed adhesive layer 45 down on the circular polarizer. The circular polarizer should be carefully cleaned to ensure that it is dust-free. Subsequently, the circular polarizer should be completely dried before adhesion. In the case of the ARCTOP® product, the step of placing the adhesive layer onto the substrate may comprise removing a protective film from the adhesive layer. In placing the adhesive layer over the circular polarizer, the antireflection film should be smoothed, preferably from one corner and one edge to the others, being careful that no wrinkles or bubbles are formed in-between the antireflection film and the circular polarizer. A soft cloth or soft roller may be used to help make sure that no wrinkles or bubbles are formed. Additionally, a standard pressure-sensitive laminating procedure may be used. Again, care should be taken to make sure that no wrinkles or bubbles from. The proper pressure is important, and varies for different sizes of materials. Accordingly, the pressure may be modified as needed to obtain the proper results.

In a wet lamination method, a light spray of water is applied to the circular polarizer and the adhesive layer. Then the antireflection layer is placed on the circular polarizer in the same manner as described above in the dry process. The film of water between the antireflection layer and the circular polarizer permits adjustment of the film and removal (i.e., by squeegee or cloth) of any bubbles that might otherwise be trapped during the lamination procedure. After the lamination procedure, a two to three day drying period is required to allow any trapped water to evaporate from the edges of the film and substrate. Any trapped water would present a problem especially during freezing temperatures.

The optical article of the present invention is useful in reducing glare and reflection in display screens including LC, LED, CRT and PDP display screens. Also, the optical article of the present invention specifically reduces glare and reflection in outdoor monitors, bank ATM machines, computer monitors, electronic navigation instrument panels, frames and show windows.

The method of mounting the optical article of the present invention is not known to be critical and would be readily apparent to one of ordinary skill in the art. That is, the only limitation in the mounting method is that the mounting method or means does not interfere with the practice of the invention. The optical article of the invention may be mounted in an outdoor monitor casing by using window mounting angles inside the casing. Window mounting angles are grooves in the casing that provide a means for support. Additionally, a frame that is attached to the optical article by screws or brackets may support the optical article. The frame may in turn be screwed or bracketed to the monitor casing. The optical article of the present invention may be mounted to an ATM machine by, for example, using a frame-type support or using any existing support wherein an existing protective panel is substituted for the optical article of the present invention.

The distance from the monitor is likewise not known to be critical. In the case of an outdoor monitor, the optical article of the present invention may be, for example, up to 12 inches from the monitor, 2–3 inches being preferred. In the case of an ATM machine, 0.5 to 2 cm are preferred.

The following examples are provided for a further understanding of the invention. However, the invention is not to be construed as limited thereto.

EXAMPLE 1

This example describes a preferred embodiment of the present invention. Specifically, a HNCP37 neutral circular polarizer, available from POLARIOD CORPORATION, Norwood Mass., is laminated onto ARCTOP® anti-reflection film by using a standard pressure-sensitive laminating roller press.

The ARCTOP® anti-reflection film has a protective film on both sides. The film on the side of the adhesive layer is removed when the film is applied to the HNCP37. The HNCP37 also has a protective film on both sides. The film on the polarizer side is removed when the ARCTOP® anti-reflection film is applied. The standard method to laminate these two materials is to start the removal of the polarizer protective film by pulling back approximately 3 inches of the film material, and folding it down so as to expose the surface underneath. The protective film on the ARCTOP® anti-reflection film is also pulled back approximately 3 inches and folded back exposing the adhesive layer to mate with the exposed HNCP37 surface. The two surfaces are carefully matched so as to eliminate any wrinkles and/or air bubbles. The sandwich of the ARCTOP® anti-reflection film and HNCP37 is then placed under a standard non-heating pressure-sensitive laminating roller press. The height of the rollers and the pressure of the rollers are determined by the thickness of the sandwich. The sandwich is fed into the laminating rollers as the two protective films are removed. The two remaining outer protective films are removed during the installation process or before use.

EXAMPLE 2

Example 1 is repeated, except that a wet lamination method is used. That is, a light spray of water is applied to the surface of the circular polarizer and to the adhesive layer of the antireflection film. The ARCTOP® anti-reflection film is then adhered to the circular polarizer by using a standard pressure-sensitive laminating procedure.

EXAMPLE 3

Example 1 is repeated, but using the following circular polarizers:

Circular Polarizer A
    HNCP10—Dark neutral circular polarizer, available from Polaroid®, Norwood, Mass.
Circular Polarizer B
    HNCP22—Dark neutral circular polarizer, available from Polaroid®, Norwood, Mass.
Circular Polarizer C
    HACP—Amber hue circular polarizer, available from Polaroid®, Norwood, Mass.
Circular Polarizer D
    HBCP—Blue hue circular polarizer, available from Polaroid®, Norwood, Mass.
Circular Polarizer E
    HGCP—Green hue circular polarizer, available from Polaroid®, Norwood, Mass.
Circular Polarizer F
    HRCP (High T)—Red hue circular polarizer, available from Polaroid®, Norwood, Mass.
Circular Polarizer G
    HRCP—Red hue circular polarizer, available from Polaroid®, Norwood, Mass.

EXAMPLE 4

This Example demonstrates the optical article of the present invention being used in conjunction with an outdoor monitor.

A 27" Phillips commercial grade television is mounted in a vandal resistant case comprising window mounting angles as supports. The grooved window mounting angles are three inches from the television. The case also contains a pair of weatherized speakers and a pair of amplifiers. The case is mounted upon a plate, which is on a pole 8.5 feet tall. The plate is angled downward at 12.5 degrees so the case and television are at this same angle. The optical article of the present invention is mounted in front of the television by placing the optical article in the grooved window mounting angles. A hood is mounted on the front surface of the case in order to reduce the direct light falling upon the screen. The hood is angled down from the top surface of the case by 12.5 degrees, and extends out from the front surface by approximately 17 inches. This hood also has sides, which extend from the end of the top surface and angle back to the front surface of the case.

EXAMPLE 5

This Example demonstrates the optical article of the present invention being used in conjunction with an ATM machine.

The optical article of the present invention is cut to the exact dimensions of the front of the existing protective screen of the ATM machine. The present front protective screen is removed from the ATM machine housing. The optical article of the present invention is used as a substitute for the previously mentioned protective screen. The ATM machine is reassembled and put back into service.

All cited patents referred to in this application are herein incorporated by reference.

The invention being thus described, it will be obvious that the same may be varied in many ways. Such variations are not to be regarded as a departure from the spirit and scope of the present invention, and all such modifications as would be obvious to one of ordinary skill in the art are intended to be within the scope of the following claims.

What is claimed is:

1. An optical article, comprising:
    a layer of a transparent resin having a self-healing property;
    an antireflection layer assembly comprising one or more layers disposed underneath said layer of transparent resin, each of said one or more layers of said antireflection layer assembly comprising a polymer; and
    a circular polarizer disposed under and bonded to said antireflection layer, either directly or through an optional adhesive layer.

2. An outdoor monitor assembly, comprising:
    an outdoor monitor; and
    the optical article of claim 1 arranged in front of said outdoor monitor, wherein said optical article is arranged in a manner which reduces glare.

3. The outdoor monitor assembly of claim 2, wherein said optical article is placed in front of the monitor of an ATM machine.

4. An optical article comprising:
    a transparent resin layer having a self healing property;
    an antireflective layer consisting essentially of a non-crystalline fluorine-containing polymer disposed underneath said transparent layer; and
    a circular polarizer disposed underneath said antireflective layer and bonded thereto, either directly or through an optional adhesive layer.

5. The outdoor monitor assembly, comprising:
    an outdoor monitor; and
    the optical article of claim 4 arranged in front of said outdoor monitor, wherein said optical article is arranged in a manner which reduces glare.

6. The outdoor monitor assembly of claim 5, wherein said optical article is placed in front of the monitor of an ATM machine.

7. An optical article comprising:
    a layer of a transparent resin having a self-healing property of at least 10 g as measured by a Heidon scratch tester at 23° C. under a relative humidity of 50% using a diamond chip having a forward end diameter of 15 μm as a scratching tool and scuff resistance of less than 10% as measured by the haze increase after 100 rotation by a Taber abrasion test conduct under a load of 500 g using CS-10F as the truck wheel at 23° C. under a relative humidity of 50%;
    an antireflection layer disposed under said layer of transparent resin consisting essentially of a non-crystalline fluorine-containing polymer, wherein the non-crystalline fluorine-containing polymer is a polymer having fluorine-containing aliphatic ring structures, or a perfluoropolyether, wherein the antireflection layer has a thickness of from 10 to 1,000 nm; and
    a circular polarizer disposed under and bonded to said antireflection layer, either directly or through an optional adhesive layer.

8. The optical article according to claim 7, wherein the resin having self-healing properties and scuff resistance, is a polyurethane resin.

9. The optical article according to claim 8, wherein the polyurethane resin is a crosslinked polyurethane resin.

10. The optical article according to claim 7, which has an interlayer of a resin having a refractive index higher than the refractive index of the resin having self-healing properties and scuff resistance, between the layer of the resin having self-healing properties and scuff resistance and the antireflection layer of a non-crystalline fluorine-containing polymer.

11. The optical article according to claim 10, wherein the interlayer is made of a resin containing aromatic rings in its main chain or side chains.

12. The optical article according to claim 7, which is an anti-reflection film or sheet.

13. The optical article according to claim 7, wherein the antireflection layer has a thickness of from 20 to 500 nm.

14. The optical article according to claim 13, wherein the resin having self-healing properties and scuff resistance is a polyurethane resin.

15. The optical according to claim 14, wherein the polyurethane resin is a cross-linked polyurethane resin.

16. The optical article according to claim 13, further comprising an interlayer of a resin having a refractive index higher than the refractive index of the resin having self-healing properties and scuff resistance, between the layer of the resin having self-healing properties and scuff resistance and the antireflection layer of a non-crystalline fluorine-containing polymer.

17. The optical article according to claim 16, wherein the interlayer is made of a resin containing aromatic rings in its main chain or side chains.

18. The outdoor monitor assembly, comprising:
    an outdoor monitor; and
    the optical article of claim 7 arranged in front of said outdoor monitor, wherein said optical article is arranged in a manner which reduces glare.

19. The outdoor monitor assembly of claim 18, wherein said optical article is placed in front of the monitor of an ATM machine.

* * * * *